(12) United States Patent
Kim et al.

(10) Patent No.: US 9,733,467 B2
(45) Date of Patent: Aug. 15, 2017

(54) SMART GLASS USING GUIDED SELF-ASSEMBLED PHOTONIC CRYSTAL

(71) Applicants: HYUNDAI MOTOR COMPANY, Seoul (KR); KIA MOTORS CORPORATION, Seoul (KR); INDUSTRY ACADEMY COOPERATION FOUNDATION OF SEJONG UNIVERSITY, Seoul (KR)

(72) Inventors: Hyun Sub Kim, Seoul (KR); Nak Kyoung Kong, Seongnam-si (KR); Young Sub Oh, Suwon-si (KR); Jin Hee Lee, Seoul (KR); Yong Ho Seo, Seoul (KR)

(73) Assignees: Hyundai Motor Company, Seoul (KR); Kia Motors Corporation, Seoul (KR); Industry Academy Cooperation Foundation of Sejong University, Seoul (KR)

(*) Notice: Subject to any disclaimer, the term of this patent is extended or adjusted under 35 U.S.C. 154(b) by 0 days.

(21) Appl. No.: 14/863,440

(22) Filed: Sep. 23, 2015

(65) Prior Publication Data

US 2016/0161822 A1 Jun. 9, 2016

(30) Foreign Application Priority Data

Dec. 3, 2014 (KR) .................. 10-2014-0172480

(51) Int. Cl.
*G02F 1/1335* (2006.01)
*G02B 26/00* (2006.01)
(Continued)

(52) U.S. Cl.
CPC .............. *G02B 26/001* (2013.01); *E06B 9/24* (2013.01); *G02B 1/005* (2013.01); *G02B 5/3016* (2013.01);
(Continued)

(58) Field of Classification Search
CPC . G02F 1/23; G02F 1/19; G02F 1/0063; G02F 1/1333; G02F 1/0018; G02B 1/005; G02B 5/3016; G02B 26/001
See application file for complete search history.

(56) References Cited

U.S. PATENT DOCUMENTS

2009/0034051 A1* 2/2009 Arsenault .............. B82Y 20/00
    359/290
2009/0092803 A1* 4/2009 Bita ...................... C08F 297/02
    428/209

FOREIGN PATENT DOCUMENTS

KR 10-1999-0004382 A 1/1999
KR 10-2003-0083913 A 11/2003
(Continued)

*Primary Examiner* — Donald Raleigh
(74) *Attorney, Agent, or Firm* — McDermott Will & Emery LLP

(57) ABSTRACT

A smart glass uses a guided self-assembled photonic crystal, including a photonic crystal layer that is interposed between a pair of conductive glass plates. The smart glass includes a first material and a second material having a different refractive index from the first material and surrounding the first material. Thereby, the smart glass has a color, even when a dye is not included, by strongly reflecting light in a specific wavelength range incident to the photonic crystal layer. This is because the first material is formed regularly to have a constant distance by guided self-assembly, and the smart glass thereby may obtain a target color by randomly adjusting the distance between the first materials.

9 Claims, 3 Drawing Sheets

(51) Int. Cl.
    *G02B 1/00*          (2006.01)
    *G02B 5/30*          (2006.01)
    *G02F 1/1334*      (2006.01)
    *E06B 9/24*          (2006.01)

(52) U.S. Cl.
    CPC .... *G02F 1/1334* (2013.01); *E06B 2009/2464* (2013.01); *G02F 2001/13345* (2013.01); *G02F 2202/32* (2013.01)

(56) References Cited

FOREIGN PATENT DOCUMENTS

| | | |
|---|---|---|
| KR | 10-2011-0029066 A | 3/2011 |
| KR | 10-2011-0050596 A | 5/2011 |
| KR | 10-2011-0050930 A | 5/2011 |
| KR | 10-2012-0001456 A | 1/2012 |
| KR | 10-2012-0036178 A | 4/2012 |

\* cited by examiner

- Prior Art -

SMART GLASS USING GUIDED SELF-ASSEMBLED PHOTONIC CRYSTAL

CROSS-REFERENCE TO RELATED APPLICATION

This application claims under 35 U.S.C. §119(a) the benefit of priority to Korean Patent Application No. 10-2014-0172480, filed Dec. 3, 2014, the entire contents of which are incorporated herein by reference.

BACKGROUND (a) Technical Field

The present disclosure relates generally to smart glass using a guided self-assembled photonic crystal, and more particularly to such a photonic crystal having a photonic crystal layer interposed between a pair of conductive glass plates.

(b) Background Art

"Smart glass" refers to an active control technology capable of reducing energy loss by freely adjusting the transmittance of light inflowing from outside and providing a pleasant environment for consumers. This is considered to be a basic technology capable of being commonly used in various industrial fields such as transportation, information display and architecture. Smart glass is expected to be actively used in various fields since smart glass may induce instant state changes by simple operation and provide various conveniences.

Smart glass has been manufactured using a polymer dispersed liquid crystal (hereinafter, "PDLC") technology. A PDLC has a structure in which micron-size liquid crystal particles are dispersed into a polymer matrix, and light transmittance is adjusted by a refractive index difference between the liquid crystal particles and the polymer caused by an external voltage. In an Off state, in which voltage is not applied, liquid crystal particles (91) are irregularly arranged, and light scatters due to the refractive index difference between the liquid crystal particles (91) and a polymer matrix (93) as shown in FIG. 1 (*a*). In an On state, in which voltage is applied, light penetrates since liquid crystal particles (91) are oriented to have the same refractive index as the polymer matrix (93), as shown in FIG. 1 (*b*).

A PDLC uses a polymer matrix, therefore, there are problems in that a haze phenomenon may occur in smart glass, in which a turbid color is obtained, and when exposed to ultraviolet light, a yellowing phenomenon may occur due to the curing or alteration of the polymer.

In addition, in a PDLC, liquid crystal particles are irregularly arranged in an Off state, and incident light irregularly scatters. Thus, a specific color is difficult to be obtained since lights in various wavelength ranges are all mixed. When a dye is added in order to color the PDLC, the transmittance of light decreases since the dye absorbs light due to its nature, which causes a problem of degrading efficiency of the PDLC itself.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The disclosure has been made in an effort to solve the above-described problems associated with prior art, and an object of this disclosure is to teach practical solutions thereto.

The objects of the present disclosure are not limited to the object described above, and other objects of the present disclosure not described above may be understood from the descriptions below, and may be more clearly seen from the exemplary embodiments of the present disclosure. In addition, the objects of the present disclosure may be accomplished by means presented in the claims and a combination thereof.

In one aspect, the present invention in accord with an embodiment thereof provides smart glass having a specific color including a pair of conductive glass plates and a photonic crystal layer interposed between the glass plates, wherein the photonic crystal layer includes a first material regularly arranged by guided self-assembly and a second material having a different refractive index from that of the first material and surrounding the first material, thereby reflecting light only in a specific wavelength range.

In one embodiment, the first material is a glass bead or a liquid crystal droplet, and the second material is a liquid crystal or a silica-titanium alkoxide.

In another embodiment, the smart glass capable of having a target color by adjusting a distance between the first materials is provided.

In still another embodiment, the distance between the first materials is from 200 to 400 nm, and a thickness of the photonic crystal layer is from 3 times to 5 times of the distance between the first materials.

In yet another embodiment, the first material has a hexagonal close-packed structure (hcp) or a face-centered cubic structure (fcc).

In another aspect, the present invention in accord with an embodiment thereof provides a method for preparing smart glass including (a) preparing a mixed liquid by mixing a first material and a second material having a different refractive index from the first material, and (b) forming a photonic crystal layer by interposing the mixed liquid between a pair of conductive glass plates so that the first material is regularly arranged by guided self-assembly.

In one embodiment, the first material is a glass bead, and the second material is a liquid crystal, and the (b) step regularly arranges the first material through guided self-assembly by applying the mixed liquid on one surface of the conductive glass plate, and pressing the mixed liquid with another pair of the conductive glass plate.

In another embodiment, the first material is a liquid crystal droplet, and the second material is a silica-titanium alkoxide, and the (b) step forms and regularly arranges the liquid crystal droplet as the liquid crystal of the mixed liquid is phase-separated by applying the mixed liquid on one surface of the conductive glass plate and drying the result.

In still another embodiment, the liquid crystal and the silica-titanium alkoxide are mixed in a volume ratio of 1:2 to 2:1.

In yet another embodiment, the mixed liquid further includes a surfactant in 1 to 5 vol %, and the surfactant includes a functional group including a metal atom and a solvophilic functional group.

Other aspects and embodiments of the invention are discussed hereinafter.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
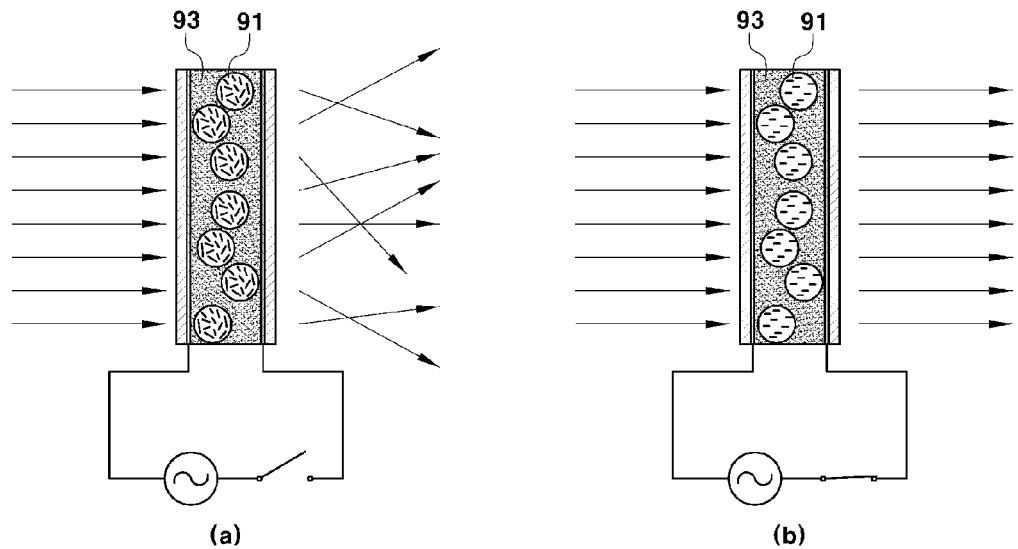
FIG. 1 is a diagram showing an existing PDLC structure.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
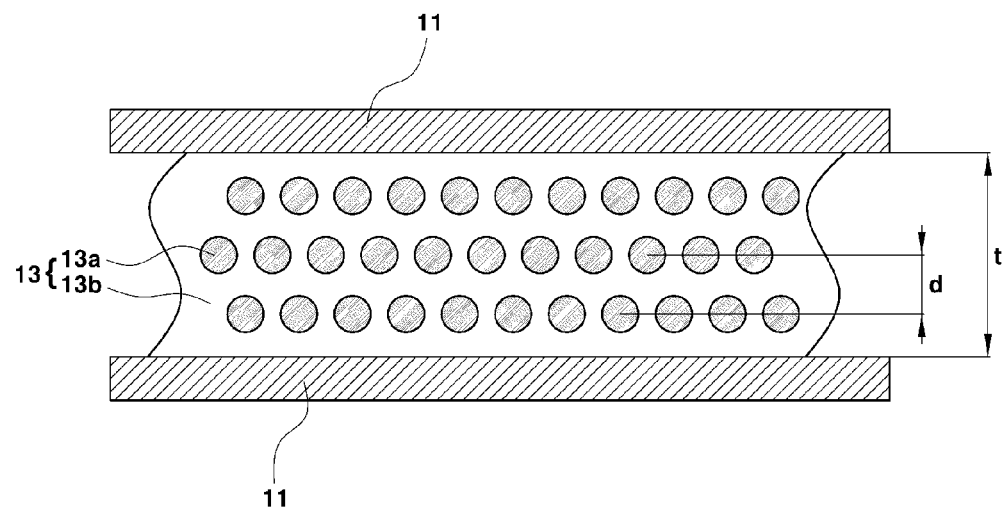
FIG. 2 is a diagram showing smart glass using a guided self-assembled photonic crystal in accord with an embodiment of the present invention.

When referring to FIG. 2, smart glass using a guided self-assembled photonic crystal according to an embodiment of the present invention includes a photonic crystal layer (13) regularly arranged between a pair of conductive glass plates (11).

The conductive glass plates (11) are obtained by coating a conductive transparent electrode such as ITO and FTO on a glass plate or a polyethylene terephthalate (PET) film, and have a structure generating an electric field in a space between a pair of the conductive glass plates (11) in an On state by supplying power from outside of the smart glass.

The photonic crystal layer (13) includes a first material (13a) interposed between the conductive glass plates (11) and regularly distributed having a constant distance, and a second material (13b) surrounding the first material (13a) and having a different refractive index from that of the first material (13a). The first material (13a) may be a glass bead or a liquid crystal droplet.

In the smart glass according to one embodiment of the present invention, a liquid crystal may be used as the second material (13b) when the photonic crystal layer (13) is formed having a glass bead as the first material (13a). Herein, the liquid crystal, which is the second material (13b), is located on the circumference of the glass bead, which is the first material (13a). In an Off state in which the conductive glass plates do not generate an electric field, the glass bead and the liquid crystal have a different refractive index, and accordingly, light scatters at an interface of both constituents.

In the smart glass according to another exemplary embodiment of the present invention, the photonic crystal layer (13) may be formed having a liquid crystal droplet as the first material (13a). The liquid crystal droplet is a droplet filled with liquid crystals, and a silica-titanium alkoxide may be used as the second material (13b). Accordingly, the silica-titanium alkoxide is located on the circumference of the liquid crystal droplet. In an Off state in which the conductive glass plates do not generate an electric field, the liquid crystal droplet and the silica-titanium alkoxide have a different refractive index, and accordingly, light scatters at an interface of both constituents.

The first material (13a) is distributed into the photonic crystal layer having a regular distance, and the scattered light generates interference with each other and may satisfy the Bragg's reflection law.

Figure 3:
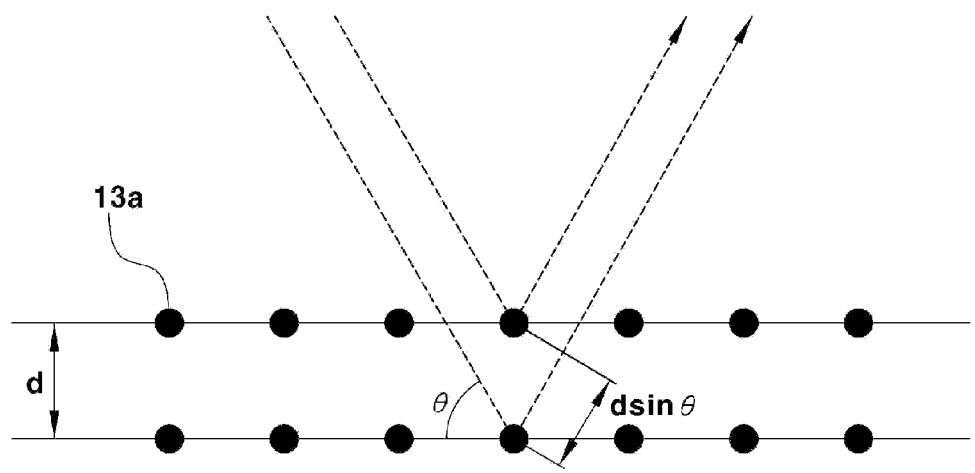
FIG. 3 is a reference diagram associated with Equation 1.

More specifically, among the light passing through the first material (13a), the light in a wavelength range satisfying the Bragg's reflection law represented by Equation 1 is reflected when referring to FIG. 3, and since the first material (13a) is continuously repeated in the same cycle, the light in the above wavelength range is all reflected generating a band gap. In other words, the first material (13a) is regularly arranged having a constant distance (d); therefore, light in the wavelength satisfying Equation 1 is strongly reflected due to constructive interference, and the rest of the light scatters at random angles and dissipates. Consequently, the smart glass displays a color of the reflected light.

$$2d \sin\theta = n\lambda \quad \text{[Equation 1]}$$

wherein,
d: distance between dielectric substances (first materials)
θ: Incident angle of light
n: Integer
λ: Wavelength of light When the distance (d) between the first materials (13a) is adjusted, smart glass having a target color may be obtained. For example, the distance between the photonic crystals is adjusted to 235 nm in order to obtain smart glass having a blue color (λ=470 nm) with respect to normal incident light (sin90°=1).

In an On state in which the conductive glass plates generate an electric field, i) a liquid crystal that is the second material (13b) is arranged in parallel to the electric field and thereby has the same refractive index as a glass bead that is the first material (13a), and passes through the incident light in one exemplary embodiment, and ii) a liquid crystal in a liquid crystal droplet that is the first material (13a) is arranged in parallel to the electric field and thereby has the same refractive index as a silica-titanium alkoxide that is the second material (13b), and passes through the incident light in another exemplary embodiment. As a result, transparent smart glass is obtained.

The first material is arranged while spontaneously maintaining a constant distance in the photonic crystal layer by guided self-assembly.

Self-assembly is a representative example of bottom-up technologies in nano processing technologies, which form a target structure by manipulating atoms and molecules, and regular patterns are spontaneously formed therethrough. However, such regularity tends to break in a wide range, and a form of self-assembly blending an artificial forcing condition, such as artificially separating the region of a repeated pattern in order to solve the above-mentioned phenomenon, is referred to as guided self-assembly.

In accord with embodiments of the present invention, the first material spontaneously forms a regular distance by adjusting the thickness of a layer that the photonic crystal layer forms.

According to one exemplary embodiment of the present invention, a glass bead is used as the first material, and the glass bead may spontaneously form a regular distance by a method including (a) preparing a mixed liquid by mixing a glass bead having a diameter of 200 to 300 nm and a liquid crystal, (b) coating the mixed liquid on one surface of a conductive glass plate, and then (c) pressing the coated side of the mixed liquid with another conductive glass plate.

When pressed by the conductive glass plate, the liquid crystals, which are in a liquid state, are pushed outward, and the glass beads, which are in a solid state, become close to each other forming a hexagonal close-packed structure (hcp).

When the distance between the conductive glass plates is adjusted to 600 to 1000 nm, the glass beads may be laminated in 3 to 6 layers establishing a lattice, therefore, a regular distance may be formed.

According to another exemplary embodiment of the present invention, a liquid crystal droplet is used as the first material, and may spontaneously form a regular distance when the liquid crystal droplet is formed by phase separating the liquid crystal from a silica-titanium alkoxide by a method including (a) preparing a mixed liquid by mixing the liquid crystal and the silica-titanium alkoxide (Si—Ti alkoxide) in a constant ratio, (b) adding a surfactant to the mixed liquid, (c) coating the mixed liquid on one surface of the conductive glass plate, and then (d) drying the result.

The silica-titanium alkoxide is prepared by (a) preparing an A solution by mixing 0.55 M of tetraethoxysilane (TEOS), 0.3 M of methyltriethoxysilane (Me-TES), 0.4 M of isopropyl alcohol and 0.343 M of nitric acid, (b) preparing a B solution by mixing 1 M of acetylacetone and 1 M of Ti-acetylacetonate, and then (c) mixing the A solution and the B solution in 1:1 to 5:1.

The liquid crystal and the silica-titanium alkoxide are mixed in a volume ratio of 1:2 to 2:1. When the ratio is 1:2 or less, there is a problem in that a high driving voltage needs to be applied due to an insufficient amount of the liquid crystals, and when the ratio is 2:1 or greater, there is a problem in that there are too many liquid crystals, and the liquid crystals are not formed to liquid crystal droplets, and are flowing out.

The mixed liquid may be coated on one surface of the conductive glass plate using a method such as spin coating, wire bar coating, doctor blade coating and the like.

The surfactant is added in order to strengthen the stability of an organic-inorganic interface, and to prevent the binding between liquid crystal droplets, and has a structure including both a functional group that includes a metal atom, and a solvophilic functional group. Alkyl phosphine oxides, alkyl phosphonic acids, alkyl phophines, fatty acids, amines, or aromatics including nitrogen may be preferably used.

The surfactant has a functional group having an affinity for organic materials, and a functional group having an affinity for inorganic materials at both ends, therefore, penetrates into an interface between a liquid crystal, which is an organic material, and a silica-titanium alkoxide, which is an inorganic material, during the drying process, and covers the liquid crystal so that the liquid crystal is uniformly dispersed among the silica-titanium alkoxide.

Figure 4:
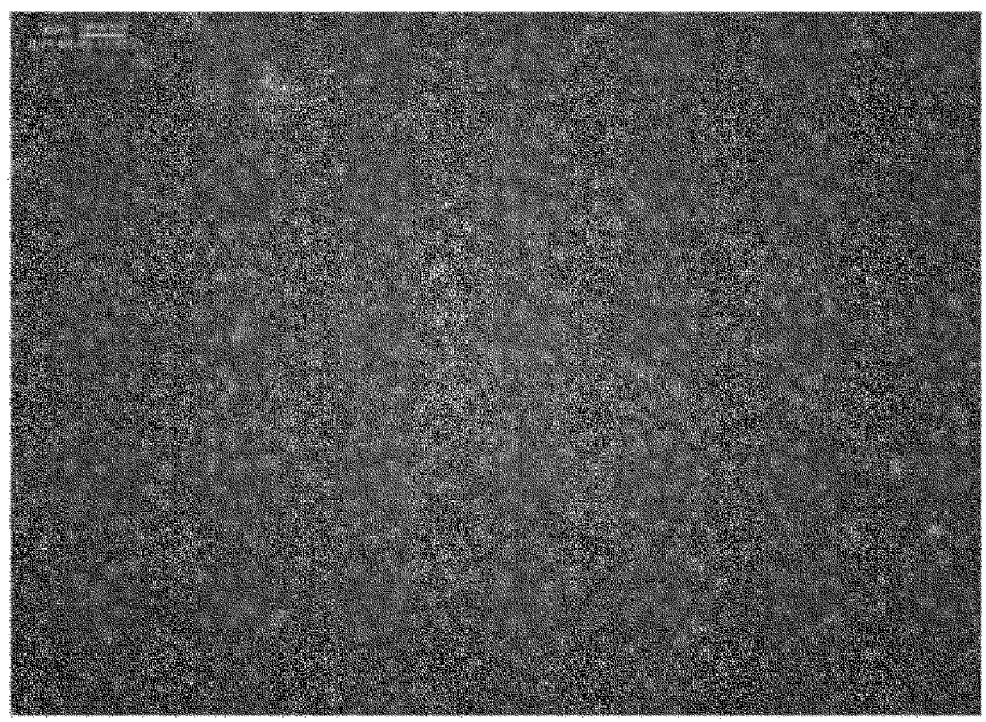
FIG. 4 is photomicrograph of a liquid crystal droplet formed having a constant distance.

When a polymer matrix and liquid crystals are phase-separated and the liquid crystals form a liquid crystal droplet in an existing PDLC, a phenomenon in which some liquid crystal droplets incorporate with other liquid crystal drople to form bigger liquid crystal droplets, or are divided into two liquid crystal droplets, occurs, preventing the formation of a regular distance. However, referring to FIG. 4, the liquid crystal droplet is capable of maintaining a constant shape and distance in accord with embodiments of the present invention by adding the surfactant, and incorporation of the liquid crystal droplet with another adjacent droplet is thereby prevented.

The surfactant may be added in the content of 1 to 5 vol %; a content of less than 1 vol % is insufficient to be dispersed to all interfaces, and a content of greater than 5 vol % has a problem in that the surfactant may act as an impurity in a chemical reaction of the liquid crystal and the silica-titanium alkoxide solution.

In accord with embodiments of the present invention, the first material is formed to have a distance (d) of 200 to 400 nm, and light in a wavelength range from blue to red is reflected according to Equation 1. As as a result, smart glass having a target color may be obtained.

However, a structure having the first material (13a) laminated in multiple layers needs to be obtained in order to form a band gap in the photonic crystal layer (13). When the number of the first material (13a) layer increases, self-assembly regularity is weakened, and therefore the thickness (t) of the photonic crystal layer (13) is adjusted to 3 times to 5 times of the distance (d) between the first materials, as shown in FIG. 2.

Figure 5:
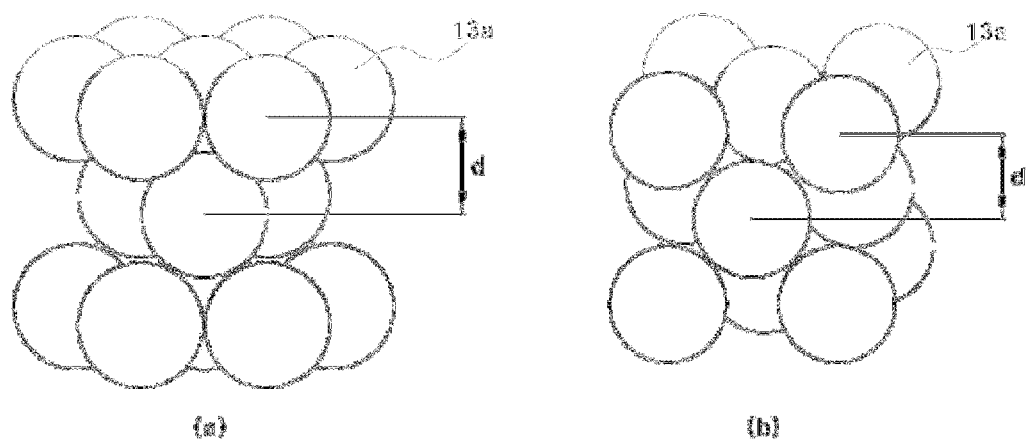
FIG. 5 is a diagram showing a hexagonal close-packed structure of a photonic crystal.

In order to adjust the distance between the first materials (13a), embodiments of the present invention are made based on an idea that the photonic crystal has a lattice structure of a hexagonal close-packed structure (hcp, a) or a face-centered cubic structure (fcc, b), as shown in FIG. 5. In other words, the first material (13a) tends to maintain a highly dense state since a force pressing the first material (13a) to have a constant thickness is applied while repulsive force between the first materials (13a) is present. Therefore, the first material spontaneously forms a lattice structure of a hexagonal close-packed structure (hcp) or a face-centered cubic structure (fcc), which is a most dense structure.

Herein, the hexagonal close-packed structure has a packing factor of 74. Therefore, the mixing ratio of i) the glass bead and the liquid crystal or ii) the liquid crystal and the silica-titanium alkoxide is maximum 74:26. Consequently, the distance (d) between the first materials may decrease by mixing the photonic crystal in a smaller ratio.

Smart glass using a guided self-assembled photonic crystal, in accord with embodiments of the present invention, forms the first material to spontaneously have a regular distance, and therefore, may have a color without adding a dye.

In addition, smart glass having a target color may be obtained by adjusting the distance between the first materials thereby having the photonic crystal layer reflecting light only in a specific wavelength range.

The present invention is effective in providing smart glass capable of having a target color without including a dye since a first material is formed in a regular pattern.

In addition, the present invention is effective in providing smart glass having high transmittance in a transparent state since a dye is not included.

Furthermore, the present invention is effective in providing smart glass capable of having a target color by adjusting the distance between first materials, thereby having a photonic crystal layer reflecting light only in a specific wavelength range.

In addition, the present invention is effective in providing clear and high-class smart glass with no haze phenomenon since a polymer matrix is not used.

The invention has been described in detail with reference to exemplary embodiments thereof, however, the scope of the present invention is not limited to the exemplary embodiments described above, and various modifications and improvements made by those skilled in the art using the basic concept of the present invention defined in the appended claims and their equivalents are also included in the scope of the present invention.

What is claimed is:

1. Smart glass having a specific color comprising:
    a pair of conductive glass plates; and
    a photonic crystal layer interposed between the glass plates,
    wherein the photonic crystal layer includes a first material regularly arranged by guided self-assembly and a second material having a different refractive index from the first material and surrounding the first material, thereby reflecting light only in a specific wavelength range, and
    wherein the first material is a liquid crystal droplet and the second material is a silica-titanium alkoxide.

2. The smart glass of claim 1 attaining a target color by adjustment of a distance between the first materials.

3. The smart glass of claim 1, wherein a distance between the first materials is 200 to 400 nm.

4. The smart glass of claim 1, wherein the first material has a hexagonal close-packed structure (hcp) or a face-centered cubic structure (fcc).

5. The smart glass of claim 1, wherein a thickness of the photonic crystal layer is 3 times to 5 times a distance between the first materials.

6. A method for preparing smart glass comprising:
    (a) preparing a mixed liquid by mixing a first material and a second material having a different refractive index from that of the first material; and
    (b) forming a photonic crystal layer by interposing the mixed liquid between a pair of conductive glass plates so that the first material is regularly arranged by guided self-assembly
    wherein the first material is a liquid crystal droplet and the second material is a silica-titanium alkoxide, and the step (b) forms and regularly arranges the liquid crystal droplet as the liquid crystal of the mixed liquid is phase-separated by applying the mixed liquid on one surface of the conductive glass plate and drying the result.

7. The method for preparing smart glass of claim 6, wherein the liquid crystal and the silica-titanium alkoxide are mixed in a volume ratio of 1:2 to 2:1.

8. The method for preparing smart glass of claim 6, wherein the mixed liquid further includes a surfactant in 1 to 5 vol %.

9. The method for preparing smart glass of claim 8, wherein the surfactant includes a functional group including a metal atom and a solvophilic functional group.

* * * * *